March 19, 1974  D. W. APPEL  3,798,122
METHOD AND APPARATUS FOR THE PRODUCTION OF FIBROUS SHEETS
Filed June 26, 1972  6 Sheets-Sheet 1

March 19, 1974  D. W. APPEL  3,798,122
METHOD AND APPARATUS FOR THE PRODUCTION OF FIBROUS SHEETS
Filed June 26, 1972  6 Sheets-Sheet 5

United States Patent Office 3,798,122
Patented Mar. 19, 1974

3,798,122
METHOD AND APPARATUS FOR THE
PRODUCTION OF FIBROUS SHEETS
David W. Appel, Neenah, Wis., assignor to Kimberly-
Clark Corporation, Neenah, Wis.
Continuation-in-part of application Ser. No. 798,409,
Feb. 11, 1969. This application June 26, 1972, Ser.
No. 266,075
Int. Cl. D21l 1/00
U.S. Cl. 162—315                                5 Claims

ABSTRACT OF THE DISCLOSURE

An apparatus arrangement and method for the generation of a fiber containing foam and the draining of the foam substantially immediately following its formation is disclosed. The draining on a foraminous support commences within about 100 milliseconds of the termination of the action which generates the foam. The conveying of the foam from the generation zone to the foraminous support is such that the fibers are not significantly changed in their orientation by movement to the foraminous support. The foam is formed in a wide, thin ribbon so that lateral spreading of the foam to attain sheet width is not necessary.

This application is a continuation-in-part of my copending application Ser. No. 798,409 filed Feb. 11, 1969, now abandoned.

FIELD OF THE INVENTION

This invention is particularly concerned with means and methods for the formation of fibrous sheets from foams containing fibers. The fibers in the foam may be short as in the case of wood pulp fibers. The fibers in the foam may be long, for example, ¼" or more, as in the case of synthetic fibers. Or mixtures of such fibers may be utilized in the apparatus and procedures in accordance with this invention. Importantly, the invention provides means for the dispersion of the fibers in a thin, wide foam ribbon which may be fed to a foraminous support for drainage of the foam substantially immediately after foam formation and without disturbance of fiber orientation in the foam.

The sheets which may be beneficially formed by the practice of this invention include creped tissue, printing paper, nonwoven fibrous webs, saturating base sheets and bulky webs.

THE INVENTION WITH RELATION TO THE PRIOR ART

In the usual procedures for the manufacture of tissue and printing papers at high commercial operating speeds, a suspension of fibers in water, that is, a slurry of fibers, is flowed onto a moving, endless drainage belt of wire cloth termed simply in the industry a "wire." The fiber weight in such slurry is usually low, that is, less than 1% fiber concentration by weight of the slurry. Such weight percent is commonly termed the stock consistency, and consistencies of 0.1% to 0.8% are the rule though, on occasion, this may be 1% or slightly more. These low consistencies are required so that the fibers, when flowed onto the wire, will be largely surrounded by water and will not clump together.

It has been known that wood pulp fibers could be provided in a foam structure and that a bulky sheet useful for insulation and the like could be provided by dewatering of such a foam on a screen. It has also been known to form relatively long synthetic fibers into a relatively stiff foam body substantially free of a liquid phase and to deposit thick fiber sheets from such foams. Less stiff foams, "wet" foams, have been formed containing dispersed cellulosic fibers and fed through generally conventional equipment to dewatering screens for the production of low density papers or sponge-like products. These various procedures for the production of products from foam are characterized by a necessity for considerable handling of the foamed material between foam formation and foam dewatering. This handling or transportation of the foam results in several adverse effects. First, the fibers tend to become oriented within the foam. This results in a high degree of fiber orientation in the final sheet, yielding a product with anisotropic physical properties. Second, handling of the foam can cause it to break down. This breakage allows the fibers to refloc, resulting in poor sheet formation. Finally, in the time necessary for transportation of the foamed material from the foam generator to the wire, significant drainage can occur within the foam. This separation of liquid from the foam may lead to the introduction of liquid onto the wire along with the foamed stock. This, in turn, adversely affects the uniformity of the final sheet for there is a tendency of the separating liquid to draw with it some fibers and, in extreme cases, this may cause a laminar effect in the final sheet.

The foam procedures mentioned commonly are directed to maintaining the fibers in a deflocced condition as the fiber system is forming and during its feed to the papermaking wire. This general objective has also been described in a nonfoamed system wherein a water-soluble gas is fed to a high consistency fiber-water slurry and then dissolved gas is expanded rapidly to create gas bubbles between fibers and force adjacent fibers apart, permitting the delivery of a deflocced stock to a succession of press rolls for water removal and sheet formation. This system is dependent upon the expanding gas from solution to create the bubbles to separate the fibers; the system is dependent then upon the gas solubility which is relatively low for air in water and the system has not gained wide acceptance.

It is a primary object of this invention to provide apparatus for the production and delivery on a continuous basis of a fiber-foam system in which the fibers are well dispersed in a fine textured, uniform, small bubble foam.

It is an important object of the invention to provide a combination of foam producing apparatus and sheet dewatering equipment in close coupled arrangement.

It is a particular object of the invention to provide a novel method for producing a fibrous sheet from a foam and which is directed to draining a fiber containing foam substantially as it emerges from the foam generator apparatus.

The invention will be more fully understood by reference to the following detailed description and accompanying drawings wherein.

In broad aspect a foam is generated in accordance with the invention by injecting air into an aqueous fiber suspension containing a foaming agent. The aqueous fiber suspension is fed to the generator on a continuous throughput basis and air is converted with the water of the suspension into fine bubbles by an agitation action on the traveling suspension. Substantially all of the water is dispersed in film form enclosing air to form the bubbles. The mechanical agitation action performed by my preferred form of generator involves subjection of the suspension and air to high shear supplemented by an impacting action to achieve the formation of a foam, an intimate mixing of the components and dispersion of the fibers in a substantially complete random orientation.

Figure 9:
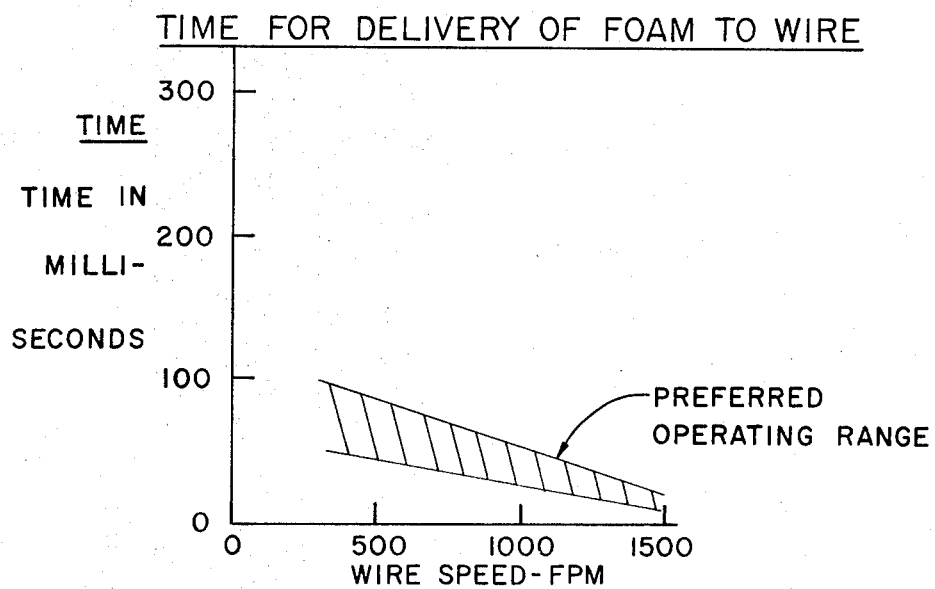
FIG. 9 is a graph of the relationship of the speed of a traveling papermaking wire and time of travel to the wire from a close coupled foam generator.

The random orientation may be maintained in the final sheet product by close coupling of the foam generator with the papermaking foraminous wire and by providing the generator of substantially the same width as the wire so that a spreading action of the foam following its creation is not necessary. Close coupling of the generator and the wire is even more important because foams tend to drain immediately upon cessation of the agitation causing the foam development. The rate of foam drainage varies widely, however, with the nature of the foam. In some processes, the proportion of liquid is limited and a stable "stiff" or dry foam results which does not drain readily in sheet forming. In other processes for foam-fiber stock production, the foam is allowed to drain and then only that portion containing a minimum of free non-dispersed liquid is subjected to the processes for sheet formation. While my equipment arrangement may employ these "dry" foams produced as indicated, I prefer to move the freshly formed nascent foam body as it emerges from the generator nozzle to the papermaking wire and to subject the foam to draining as it emerges from the generator nozzle. By this arrangement I present the foam containing the dispersed fiber to the wire within about 100 milliseconds following termination of the action (FIG. 9).

This time interval is insufficient for significant liquid separation to occur ahead of the sheet forming process, that is, the liquid remains dispersed.

Once the foam is on the wire and moving with it, the fibers are relatively fixed in position by the foam structure and are not readily subject to reorientation as the sheet is being set. Generally, the length of time needed to set the sheet on the wire is between 1 and 5 seconds.

I have found that a relatively "wet" foam is most suitable for many purposes and is attained when the air to liquid ratio is less than 2:1 by volume, that is, a specific gravity greater than about 0.35 as determined only by the liquid and air content. The foams I prefer for the purpose are relatively or marginally stable foams suitably termed "wet" foams, having a specific gravity based only on the air and water present of 0.3 to 0.5 and containing generally 100 parts of air (by volume)
50-80 parts of water (by volume), and
1-5 parts of fiber per 100 of water on a weight basis.

While these proportions may be varied somewhat, I have found that below about 30 parts by volume of liquid to 100 of air (or other gas) a relatively stiff, stable foam like that of shaving foam consistency is obtained. Such a foam is difficult to drain on the forming wire. On the other hand, foams much above 100 parts by volume liquid to 100 parts air are generally too unstable and do not separate the fibers sufficiently to obtain uniform formation in the final product.

The marginally stable foams require a minimum lag time between foam formation and delivery to the forming wire. Once on the wire, this type of foam breaks and drains quite easily. Breakage of the foam of the kind occurring and required to occur on the wire would be most deleterious were it to occur to any substantial extent prior to foam deposition on the wire. The most common adverse effect would be thick and thin spots throughout the sheet. Among the important advantages yielded by use of these readily drained foams are the following:

(1) Higher speed production.
(2) A shorter, more compact, forming section.
(3) The possibility of making heavier basis weight sheets.
(4) Lower vacuum and/or power requirements.

As already noted, fiber containing foams have previously been employed to produce rather bulky, thick mats suitable for insulation material and the like. The equipment arrangement of this present invention has this capacity also. The production of flat sheets of conventional paper such as printing paper or tissue is also accomplished quite readily with my arrangement and method. Specifically, cellulosic paper sheets having a basis weight in the range of 15 to 30 pounds per 2880 sq. ft. are readily attained. Such sheets are produced from foam delivered to the papermaking wire in a wide ribbon having a ratio of width to thickness of foam of greater than 50 to 1 and usually at least 100 to 1.

The slurry feed to the foam generator in the practice of the method of invention includes a foaming agent. The agent may be anionic, cationic or non-ionic. Conventional commercial agents such as soaps, liquid foaming agents or solid foaming agents serve the purpose. Generally, surface active agents such as those described in McCutcheon's Detergents and Emulsifiers, 1971 Annual, Allured Publishing Company, may be employed. In the practice of the invention such agents pass with the "white" water and are recirculated to the fiber slurry with the white water.

Figure 1:
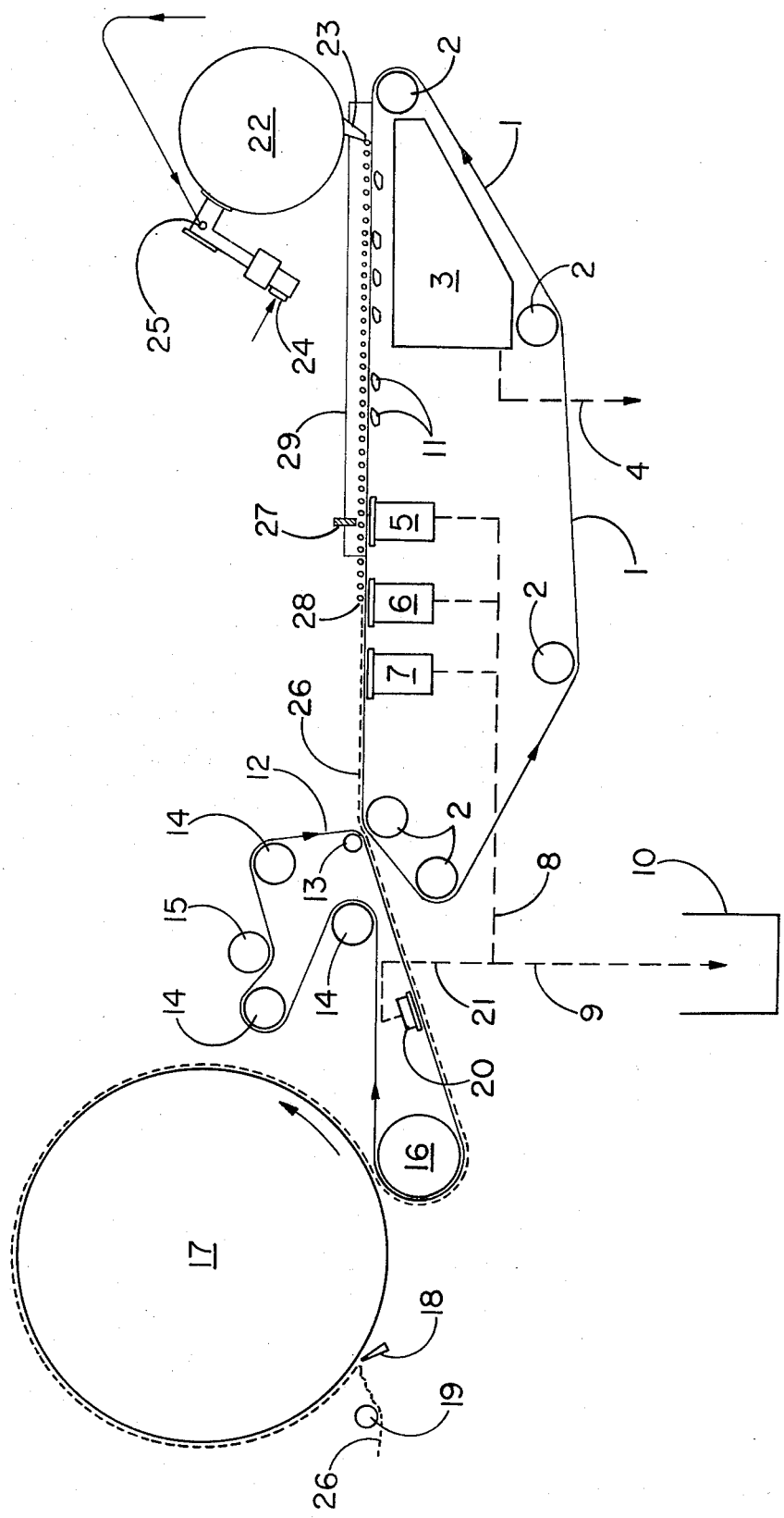
FIG. 1 is a view in side elevation schematically representing an apparatus arrangement in accordance with the invention and including a foam generator close coupled with a foam receiving foraminous support and dewatering mechanism.

Referring to the drawings more in detail, the numeral 1 (FIG. 1) designates a stock receiving foraminous support in the form of a Fourdrinier wire. A plurality of rolls 2 support the wire for movement in an endless path. The numeral 3 indicates a tank and the numeral 4 the return line for recycling of white water. Vacuum boxes 5, 6 and 7 are positioned beneath the stock receiving wire and through common conduit 8 and line 9 communicate with a tank 10 to which liquids withdrawn from a web on the wire will flow under the influence of the vacuum. Foils 11 beneath the wire aid initial dewatering of the sheet in conventional manner.

A felt 12 as it passes over roll 13 is arranged to contact a web traveling on the wire and to pick such web from the wire. Carrying rolls 14 support the felt and idler roll 15 is provided to permit of adquately tensioning the felt. A web taken up by the felt is transported to press roll 16 and dryer 17. Dryer 17 is a conventional Yankee dryer drum and a creping blade 18 and web withdrawal roll 19 cooperate with the dryer. The web in its passage to the press roll is subjected while on the felt to vacuum pressure at 20. The exhaust line for liquid removal is designated at 21 and communicates with liquid receiving tank 10.

The numeral 22 (FIGS. 1 and 2) indicates a foam generator. The generator has nozzle outlet 23 immediately above wire 1. The outlet is approximately the same width as the wire (numeral 1 in FIG. 3) and spreading of foam flowing from the nozzle to the wire is not necessary. The foam as it flows to the wire is somewhat fluid and spreading is possible but leads to shearing of the fibers and fiber orientation. I prefer to avoid the discontinuities which may occur with foam spreading actions. The nozzle is suitably positioned only slightly above the wire, frequently about 1½". Suitable results may be obtained up to about 24" depending upon foam characteristics, wire speed, foam volume flow and the like. I prefer the more close couplings, however, as such permits the presentation of the foam while it is quite fluid and wet to the wire.

A stock inlet to the foam generator is indicated at 24 and a fluid or air inlet at 25. The web or sheet formed by foam flowing from the generator to the wire is designated at 26.

Figure 2:
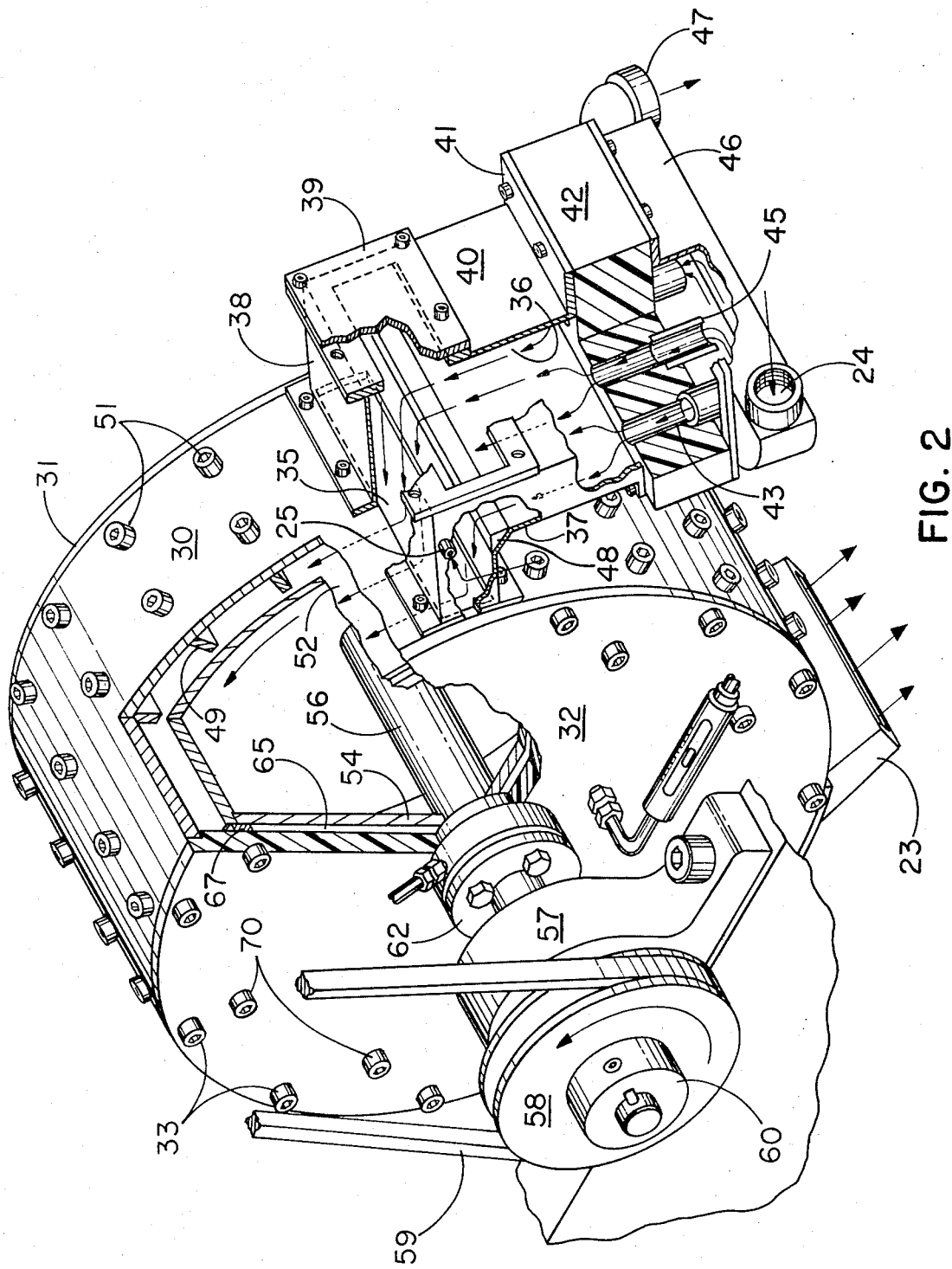
FIG. 2 is a perspective view of a foam generator in accordance with the invention and with parts broken away to indicate the cooperative relation of apparatus components.

Referring now more particularly to FIGS. 2–5 inclusive, a cylindrical stationary outer housing wall 30 has circular wall closing end plates 31, 32. Bolts 33 secure the end plates to the housing wall 30 along the peripheral edges of the wall as indicated (FIG. 2). The housing wall 30 has an outlet opening 34 (FIG. 4) in a lower peripheral portion of the housing wall and such opening communicates directly with nozzle 23.

The cylindrical housing wall 30 also includes an inlet opening 35 which, like the outlet opening 34, extends the full width of the housing wall. An angle shaped flow channel 36 of the width of the inlet opening 35 is provided by a combination which includes the reversely bent laterally extending (FIG. 2) plate 37 secured to the housing, and the laterally extending upper angle iron 38 also secured to the housing. An inspection cover 39 suitably of clear plastic is carried on one end by support 40 and at the other end is secured to angle iron 38. A flange 41 partially encloses a block of plastic 42. The block 42 carries a plurality of bores 43 (four in number in the present instance), the plastic being counter-bored as at 44. Plastic tubes 45 are received in the counterbores 44 and project downwardly (FIGS. 2 and 4) into manifold 46. The manifold communicates inlet 24 with recycle line 47 and also through tubes 45 and bores 43 with the weir 48 in channel.

The housing wall 30 has projecting interiorly around the inner circumference a plurality of bars 49. The bars are retained in fixed position by bolts 51 and have a clearance 50 with a cylindrical rotor 52. The rotor 52 and stationary housing wall 30 define an annulus into which bars 49 extend. The rotor 52 also has closing end covers 53 and 54.

Figure 3:
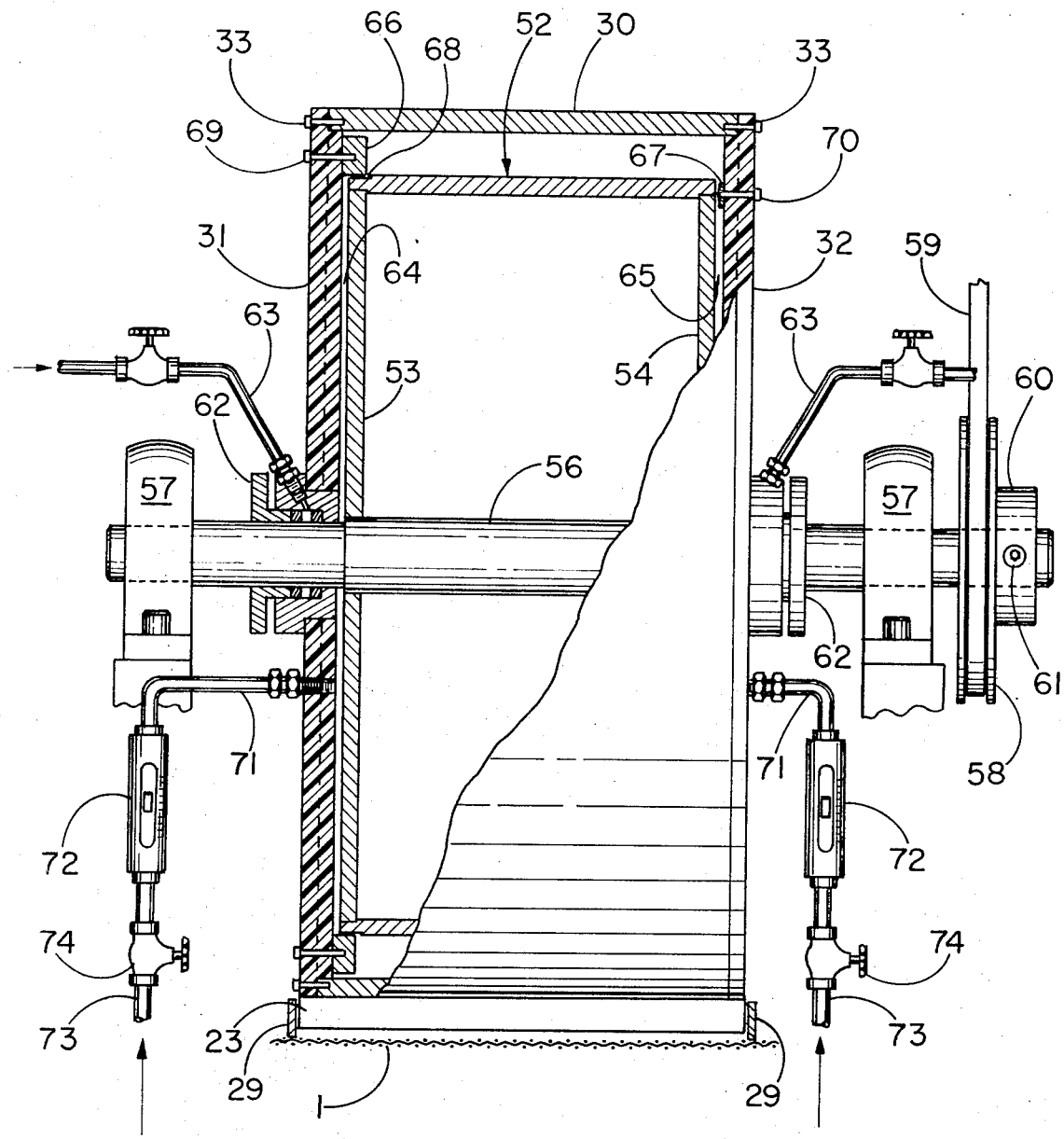
FIGS. 3, 4 and 5 are views of the foam generator further illustrating the relationship of components for the generation of a fiber containing foam.
Figure 4:
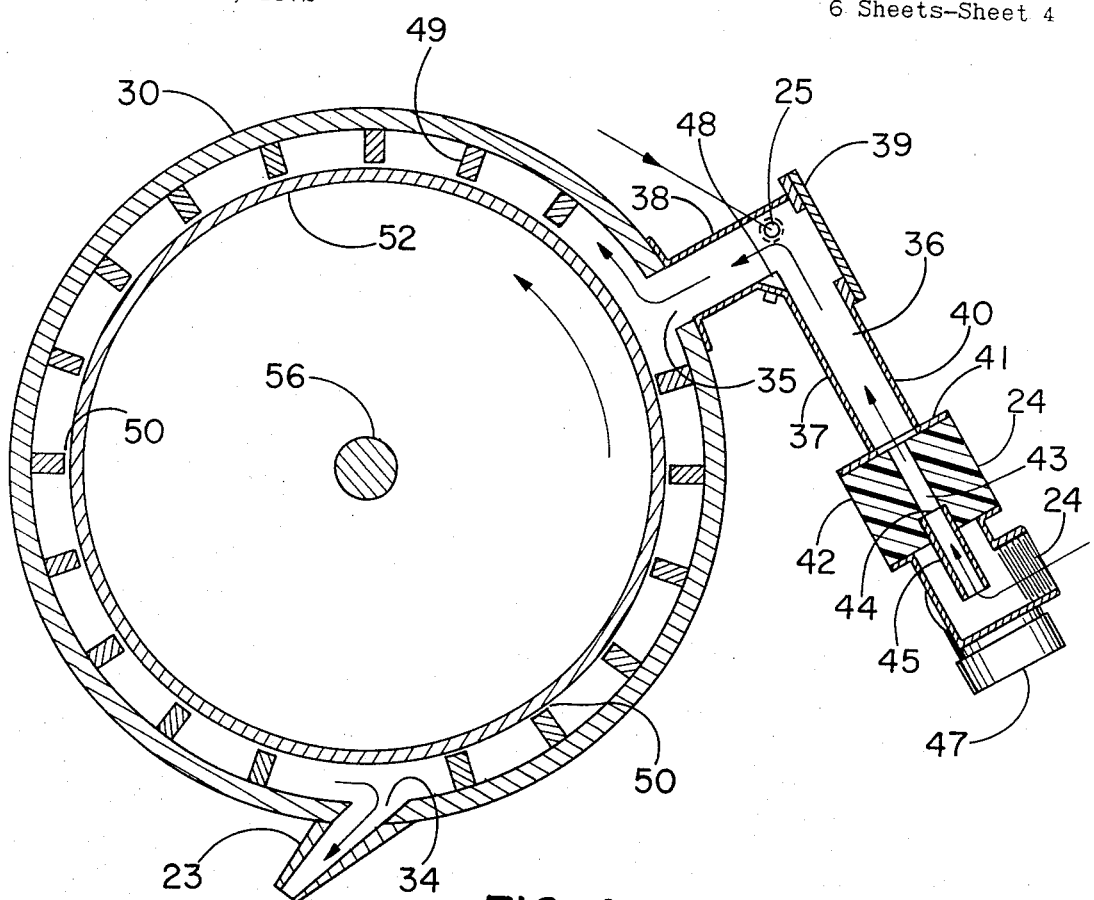

Referring now more particularly to FIGS. 2 and 3, the rotor 52 is shown as carried by shaft 56 for rotation with the shaft. Shaft 56 extends through end plates 31, 32 in supporting relation to the plates and is itself carried by pillow blocks 57. A pulley 58 carrying a V-belt 59 and having a hub 60 is retained positioned on shaft 56 by set screw 61.

A packing gland 62 is provided on either side of the generator on shaft 56 and serves to provide sealing between the stationary housing end plates 31, 32 and the rotating shaft for lubricant, preferably water, supplied through lubricant lines 63.

A first end spacing 64 is defined by the end plate 31 and closing cover 53 of the rotor structure; a second end spacing 65 is defined by the end plate 32 and closing cover 54. The spacings 64, 65 are bordered peripherally respectively by sealing rings 66, 67. The cylindrical rotor 52 is grooved peripherally on one edge at 68 (FIG. 3) to provide for close positioning of the ring 66 with the rotor. The ring 66 is retained in position by bolts 69, and bolts 70 retain the ring 67 fixed relative to the end plate 32. The spacing between sealing ring 66 and rotor surface 68 is quite small, suitably about 0.005 inch. Similarly, the spacing between sealing ring 67 and rotor cover 54 is about 0.010 inch. A flow of water, supplied by conduit 71 through flow gauge 72 from line 73 and controlled by valve 74 provides a liquid seal in these spacings. This serves to prevent fibers from entering into spacings 64 and 65.

Figure 8:
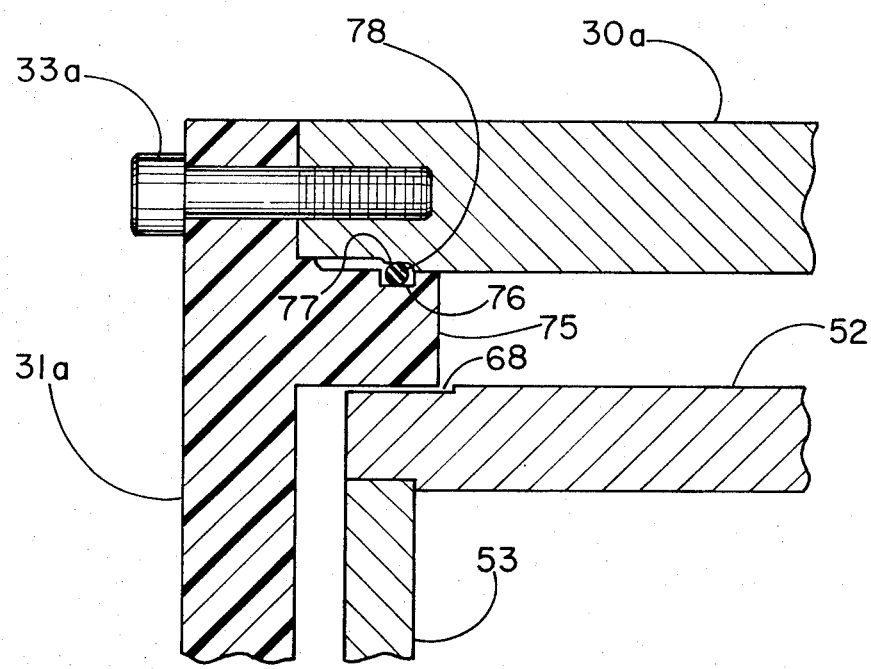
FIG. 8 is a fragmentary view in section of a modified seal useful in the foam generator structure.

A modification of the sealing arrangement is shown in FIG. 8. The cover plate 31a secured to the housing wall 30a by threaded bolts as at 33a has a peripheral inner protuberance 75. The protuberance 75 is peripherally recessed at 76 to accommodate a rubber "O" ring 77 which extends around (not shown) the inner periphery between the cover plate 31a and the circumferential housing wall 30a. In this case the liquid seal spacing is that between rotor surface 68 and protuberance 75, which is about 0.005 inch.

I have found that the fluid seals formed by the water flowing inwardly to the spacings 64, 65 are essential to operation of the generator on a continuous basis for forming foams containing fibers. The flow through the end spacings prevents the clumping of fibers which may tend to occur between the stationary housing and the rotor. Apparently this tendency increases with time of operation and clumped fibers tend to be thrown from the generator to the wire. Such clumps not only cause poor sheet formation but can lead to holes in the sheet and poor vacuum action in dewatering of a traveling sheet.

In specific application to form a sheet of tissue paper the following example illustrates in detail the mode of equipment operations.

A Morden Slusher, Model A, is filled with 400 gallons of recovered "white water" containing 0.18% of surfactant. The surfactant is an ammonium salt of a sulfated linear primary alcohol ethoxylate, a product of General Aniline and Film Corporation, marketed under the designation Alipal AB–436.

Baled pulp is quickly added to the slusher as soon as possible after the mixing impeller has been started. The amounts and types of pulp added are as follows:

| Type of pulp: | Weight, lbs. |
|---|---|
| Northern kraft | 80 |
| Southern hardwood kraft | 80 |
| Northern sulfite | 40 |
| Total | 200 |

The pulp is added as soon as the impeller in the slusher has attained operating speed to avoid generation of an excessive amount of froth. Since the white water contains foaming agents, the churning action of the impeller generates a copious amount of froth in a short time. If not controlled, the froth would spill over and engulf the area around the slusher. Fortunately, stocks with consistencies at about 6% or higher do not froth up. Hence, maintaining a high consistency inside the slusher becomes a convenient method for controlling froth formation. The froth attained at this stage is a froth of large bubbles not suitable for uniform, hole-free sheet formation and is to be distinguished from the fine bubble foam material produced by the described foam generator.

After the stock has been mixed for ¾ of an hour, it is pumped from the Morden Slusher to a dump chest for storage.

Stock from the dump chest is pumped to a refiner and refined to a freeness of 470 CSF. The refined stock is discharged into a high density column. During the run, refined stock is periodically replenished and the stock level is always maintained above the dilution zone at the lower portion of the column.

Dilution of stock to the desired consistency takes place in a dilution zone and at the inlet to the fan pump. The amounts of recovered white water going to these locations are controlled by a signal from a DeZurik Consistency Meter.

When consistency control has been established, stock is introduced into the flow distributor or manifold located at the feed intake of the foam generator. Make-up surfactant solution may be added to the stock far enough from the generator to insure good mixing of the surfactant in the stock before reaching the foam generator. The mode of stock preparation and the equipment employed as thus far described are generally conventional in the papermaking art.

Air is introduced in the channel 36 leading to the foam generator just above the manifold at 25 in the area of weir 48. The flow of the slurry over the weir tends to provide a uniform layer for air introduction. The amounts of side seal water in the foam generator is adjusted to keep the spaces between the sides of the rotor and end plates free of stock. Excess seal water is to be avoided; otherwise the stock could be overly diluted, quality of the foam would become difficult to control, sheet formation may become poor, and basis weight along the edges of the sheet may become light.

Figure 5:
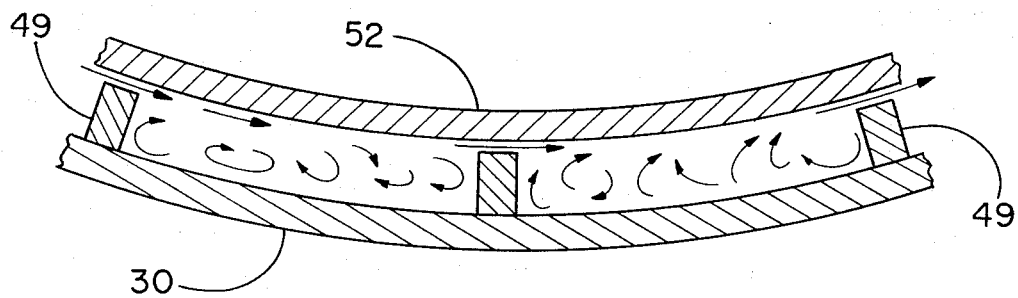
Figure 6:
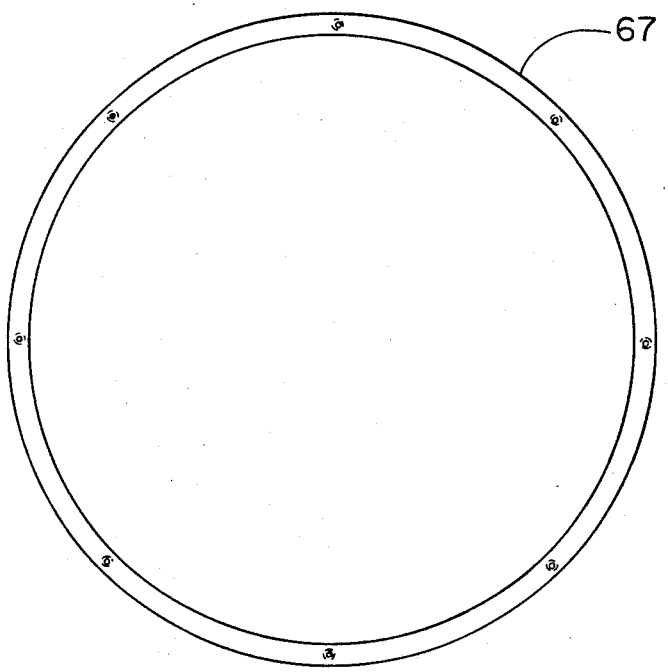
FIGS. 6 and 7 are views of sealing components useful in conjunction with the generator.
Figure 7:
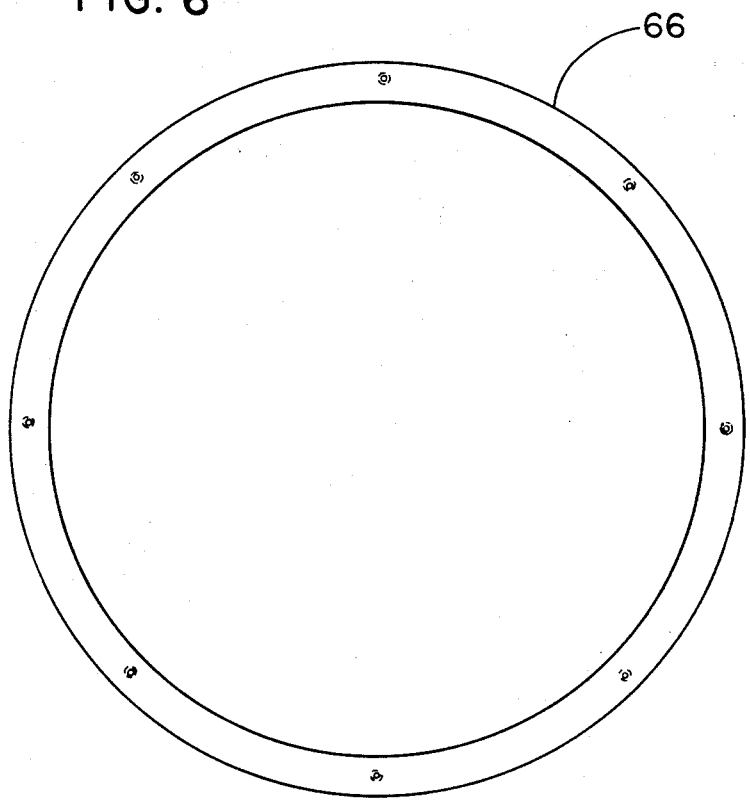

The stock is foamed by the combination of air introduction and agitation in the foam generator. As the stock is pumped to the generator at the inlet 35 and through the generator, it is picked up by the rapidly rotating rotor 52 and is thrown against the inner surface of the housing 30 and the foaming bars 49. This produces a mixing action as illustrated in FIG. 5. This very vigorous agitation disperses the air as fine bubbles within the stock. In addition, the fibers in the stock are uniformly distributed within the foam as it is being formed. The bubbles formed are very fine, having a diameter within the range of 1 to 25 mils as determined by microscopic examination. Substantially all the liquid is converted to foam, but as soon as the agitation action is terminated at the nozzle, liquid separation is initiated.

The foamed stock is directed onto the wire 1 through nozzle 23 which is suitably 180° or more from the inlet 24. The wire may have a dam 27 which serves to level the foamed stock, smooth out any surface fluctuations, and thereby insure uniform drainage and a straight dry line across the machine at about the area indicated at 28. Solid deckle boards 29 ride on each side of the wire and contain the foamed stock between them, thus controlling the width of the sheet.

Two flat boxes 5, 6 are used to set the sheet and a third one at 7 is used to remove more liquid from the set sheet. The dam 28 is located above the first flat box. Drained fluids underneath the wire are scraped off first by the hydrofoils 11. Foam is then drawn through the wire by the relatively low vacuum pressure in box 5. The dam above this box 5 provides a final leveling of the foam to compensate for any residual surface waviness coming from the delivery of foam to the wire. The dry line 28 is established at the second flat box. The vacuum pressure is greater in this second box, and the sheet is set while it is passing over it. The wet sheet is then picked up by felt 12 and transferred to dryer 17 where it is dried before being rolled up at reel 19.

Liquid and the heavier (wetter) foam from the flat box, and the sheet is set while it is passing over it. The machine. The lighter foam is entrained in the air stream inside the vacuum lines. The liquid is separated out of the air first by settling in a tank and then by shear and centrifugal action in a cyclone separator (not shown). All the recovered liquid is pumped back to the white water holding tank.

The operating conditions of the experimental run with the mentioned furnish are summarized as follows:

Furnish:
    40% northern kraft softwood,
    40% hardwood kraft, 20% northern sulfite refined to 470 CSF
Consistency of stock to machine: 1.6%
Stock feed rate: 10 g.p.m.
Air feed rate: 20 g.p.m. or 2.67 c.f.m.
Surfactant in feed stock: 0.25% Alipal AB–436 (ammonium salt of a sulfated linear primary alcohol ethoxylate)
Foam generator's rotor speed: 800 r.p.m.
Nozzle width: 11½"
Machine wire speed: 300 f.p.m.
Wire width: 14"
1st flat box vacuum pressure: 10" $H_2O$
2nd flat box vacuum pressure: 60" $H_2O$
3rd flat box vacuum pressure: 100" $H_2O$
Basis weight of product: 12½#/2880 ft.²

The equipment, of course, may operate with other types of feed stock, other feed rates, other machine speeds, and many other operating conditions. Also, variations in mechanical arrangements and structural details could be equally acceptable. The latitudes of some of these parameters and design details are listed in the following:

(1) Feed stock could be made of wood pulp, natural or synthetic fibers up to 1" long, or blends of these fibers. Additives and fillers may also be used in formulating the furnish.

(2) Feed stock consistency may be as high as 3%; however, 1% to 2% is preferable.

(3) Air/stock volumetric ratio can vary from 1:1 to 4:1. Ratio of 2:1 or less is preferable. A suitably dispersed foam will contain bubbles in the 0.001" to 0.025" diameter range.

(4) Surfactant could be any of the numerous anionic, non-ionic, or cationic compounds available so long as a uniform small bubble foam can be generated with it.

(5) Surfactant concentration in the liquid phase usually is in the range of 0.15% to 0.30% for most of the acceptable foaming agents. For example, the surfactant Alipal AB–436 used herein requires about 0.25%. Higher concentrations of surfactant do not help to generate a better foam. On the other hand, uniform foam cannot be generated without sufficient amounts of foaming agent.

(6) Effect of pH on foaming properties requires appropriate selection of surfactant. For example, Alipal AB–436 functions effectively in a neutral or slightly alkaline pH range.

(7) Operable temperature range of the foamed slurry also influences the choice of surfactant. With Alipal AB–436 temperatures in the range of 70° F. to 120° F. were found to be completely satisfactory.

(8) For the foam generator with a 24" diameter rotor, the rotational speed range is 600 to 1150 r.p.m. If the diameter of the rotor is 12", the range is 1000 to 2500 r.p.m. By a rule of thumb, a satisfactory speed would be $5000/d$ r.p.m., where $d$ is rotor diameter in feet.

(9) Configuration of foaming bars inside foam generator:

(a) Height of foaming bars or teeth ranges from ¼" to 2"; ¾" to 1½" preferred.
(b) Clearance between rotor surface and bars or teeth ranges up to ½"; ⅛" to ⅜" preferred. The larger clearances provide larger stock throughput capacities.
(c) Thickness of teeth ranges from ¼" to 2"; ¾" to 1½" preferred.
(d) Teeth spacing may suitably be between about 1½" to 6"; 3" to 5" preferred. Absolutely even spacing of teeth is not required, but they should be well distributed between inlet and outlet.

(10) Diameter of the rotor in the foam generator may be from 1 to 4 feet. A two foot diameter rotor seems to be optimum based on operational and structural considerations.

(11) The liquid stock feed to the generator can vary from 0.1 to 8.0 gal./min. per inch of width. The normal operating range with a 2 ft. diameter, 12 inch wide generator is 0.7 to 5 gal./min. per inch of width.

(12) The foam generator nozzle extremity could be placed from about 1½" to 18" from the wire; preferably less than 6".

Referring now somewhat more particularly to FIG. 9, the graph indicates the preferred range of operation for delivery of the foam to a papermaking wire as the wire speed increases. Basically, the foam should be delivered to the wire at wire speed. At a given speed of wire movement, for example, 500 f.p.m., and a travel distance from the generator to the wire of, for example, 6" as represented by the upper line of the graph, a time of delivery is very nearly 100 milliseconds. Reducing the travel distance to, for example, 3" as represented by the lower graph line, reduces the delivery time by about one-half; the closeness of the generator to the wire is dependent upon mechanical factors. Generally, it is preferred to place the generator as close to the wire as possible. Also, as will be noted from FIG. 9, the higher wire speed at the distance of 3" requires a time for delivery of only about 10–20 milliseconds. To achieve this delivery time, pumping of the foam at a faster rate is, of course, required. Conventional variable speed pumps for the stock serve the purpose well.

As many apparently widely different embodiments of this invention may be made without departing from the

What is claimed is:

1. In combination, in apparatus for producing a fibrous sheet, a traveling foraminous support, a nozzle of substantially the same width as the support mounted so that the nozzle extremity is within about 1½ inches to 18 inches of the foraminous support for delivering a foam to the support, a foam generator having a stationary casing and a rotor within the casing defining an annular channel communicating directly with the nozzle and of substantially the same width as the nozzle, an inlet in such casing for flow of liquid materials to said foam generator, a weir between the inlet and the foam generator for controlling the distribution of flow of materials through the inlet to the foam generator, air inlet means in said casing between the weir and foam generator for the introduction of air into materials flowing over said weir, an outlet in said casing communicating with said nozzle, and means for dewatering a foam received on said foraminous support from said nozzle extremity.

2. The combination as claimed in claim 1 in which the stationary casing has foaming bars fixed thereon in spaced relation around the channel and the clearance between the foaming bars and rotor is between about ⅛ inch to ½ inch.

3. Foam generating apparatus adapted for the generation of foams containing fibers, comprising: a stationary housing member having a cylindrical wall and closing end walls, a rotatable shaft co-axial with said cylindrical wall projecting through the housing member and rotatable with respect to said member, a cylindrical rotor having closing end plates supported on the said rotatable shaft for rotation therewith and defining with the cylindrical wall of the housing member an annular flow passage, teeth projecting into said annular flow passage from said cylindrical wall of the housing member and extending axially with the housing member to provide high shear and an impacting action which results in foam formation and the dispersion of material moving through the flow passage in a substantially complete random orientation, said teeth and rotor having a clearance of between about ⅛ inch to ½ inch, having inlet means in the periphery of said cylindrical wall for inflow of material to said flow passage, outlet means in the periphery of said cylindrical wall for outflow of foamed material from said flow passage, said outlet means being spaced around the periphery of said cylindrical wall at least about 180° from the inlet means, and sealing means at each axial end of said rotor, each sealing means including a sealing ring retained by the housing end wall member and bordering a spacing defined by a closing end wall of the housing member and a closing end plate of the rotor, said spacing communicating with said annular passage, and means for maintaining a flow of fluid through said spacing to said annular passage.

4. Foam generating apparatus as claimed in claim 3 and in which the sealing ring of a sealing means is of about the same diameter as the cylindrical rotor.

5. Foam generating apparatus as claimed in claim 4 in which the cylindrical rotor is grooved peripherally around the circumference thereof adjacent a sealing ring for close engagement with the sealing ring.

References Cited

UNITED STATES PATENTS

| | | | |
|---|---|---|---|
| 3,716,449 | 2/1973 | Gatward | 162—183 |
| 3,542,640 | 11/1970 | Friedberg | 162—101 |
| 3,215,642 | 11/1965 | Levy | 252—359 |
| 619,012 | 2/1899 | Davis | 241—242 |
| 3,284,056 | 11/1966 | McConnaughay | 259—9 |

S. LEON BASHORE, Primary Examiner

PETER CHIN, Assistant Examiner

U.S. Cl. X.R.

162—101, 341; 252—359

UNITED STATES PATENT OFFICE
CERTIFICATE OF CORRECTION

Patent No. 3,798,122                    Dated March 19, 1974

Inventor(s) David W. Appel

It is certified that error appears in the above-identified patent and that said Letters Patent are hereby corrected as shown below:

Column 7, line 35, delete all the words in line 35 "box, and the sheet is set while it is passing over it. The"; then substitute the words --boxes are collected in the seal tank 10 underneath the--.

Signed and sealed this 10th day of September 1974.

(SEAL)
Attest:

McCOY M. GIBSON, JR.          C. MARSHALL DANN
Attesting Officer              Commissioner of Patents